United States Patent [19]

Delmon et al.

[11] 4,203,917

[45] May 20, 1980

[54] CATALYTIC PROCESS FOR PREPARING NITRILES FROM AMIDES

[75] Inventors: Bernard M. Delmon, Wavre; Michel C. Portenart, Drogenbos; Heinz Viehe, Beersel, all of Belgium

[73] Assignee: Unibra Societe Anonyme, Brussels, Belgium

[21] Appl. No.: 884,443

[22] Filed: Mar. 7, 1978

Related U.S. Application Data

[63] Continuation-in-part of Ser. No. 769,826, Feb. 17, 1977, abandoned.

[30] Foreign Application Priority Data

Feb. 19, 1976 [GB] United Kingdom .............. 06595/76
Feb. 24, 1978 [BE] Belgium ................................ 185451

[51] Int. Cl.$^2$ ............................................. C07C 120/10
[52] U.S. Cl. ................................ 260/465 B; 260/465.2
[58] Field of Search ........................... 260/469.2, 465 B

[56] References Cited

U.S. PATENT DOCUMENTS

| | | | |
|---|---|---|---|
| 2,203,861 | 6/1940 | Deem | 260/465 B |
| 3,012,060 | 12/1961 | Aries | 260/465.2 |
| 3,256,311 | 6/1966 | Becke et al. | 260/465 B |
| 3,275,531 | 9/1966 | Sennewald et al. | 203/78 X |
| 3,514,478 | 5/1970 | Becke et al. | 260/465 B |
| 3,578,696 | 5/1971 | Blanck | 260/465.2 |

FOREIGN PATENT DOCUMENTS

214473  4/1958  Australia .............................. 260/465.2

OTHER PUBLICATIONS

Krabetz, Chemie-Ing.-Techn. 46 (1974) 24, pp. 1029–1041.

*Primary Examiner*—Joseph Paul Brust
*Attorney, Agent, or Firm*—Sughrue, Rothwell, Mion, Zinn and Macpeak

[57] ABSTRACT

This invention relates to a new catalytic process for preparing nitriles such as acetonitrile, propionitrile or benzonitrile, from amides, such as acetamide or alkylacetamides, propionamide or alkylpropionamides, formanilide or alkylformanilides.

According to this invention, the amide is reacted in gaseous phase in a reactor on a solid catalyst of the ammoxidation type, such as bismuth phosphomolybdate, at a temperature comprised between about 400° and 650° C.

9 Claims, No Drawings

CATALYTIC PROCESS FOR PREPARING NITRILES FROM AMIDES

CROSS-REFERENCE TO RELATED APPLICATION

This application is a continuation-in-part of U.S. Ser. No. 769,826, filed Feb. 17, 1977 in the names of the present inventors and entitled "New Catalytic Process for Preparing Nitriles for Amides," now abandoned.

BACKGROUND OF THE INVENTION

1. Field of the Invention

The present invention relates to a catalytic process for preparing nitriles from amides.

2. Description of the Prior Art

It is known for instance from U.S. Pat. Nos. 3,256,311, 3,275,581 and 3,514,478, from German Pat. Nos. 1,086,710 and 1,908,967 and from French Pat. Nos. 1,536,750 and 1,250,165 that nitriles may be formed from N-alkylformamides, N-arylformamides, and $\alpha,\omega$-diformamides. U.S. Pat. No. 3,275,581 also discloses the formation of nitriles from primary amines in the presence of formic acid or formates.

The catalysts used in these known processes are silica gels of various porosities. They may be activated with up to 10% of oxides of metals selected from groups III-A, IV-B, V-B and VI-B of the periodic classification of elements.

These catalysts have a relative short active life, even if they can sometimes be regenerated.

It has been tried to prevent this catalyst die-off and to increase their active life by various techniques: by working under reduced pressure (according for instance to German Pat. No. 1,908,967), by using an inert gas such as $NH_3$, CO or $N_2$ (according to for instance U.S. Pat. No. 3,275,581 and German Pat. No. 1,086,710) or by dissolving the formamides in solvents such as nitriles of fatty acids or benzene-carboxylic acids or in other alkylformamides than the formamide which is reacted (according to for instance French Pat. No. 1,536,750).

None of these techniques has however given very interesting results and both the catalyst die-off and the catalytic activity and selectivity have caused drawbacks to these processes.

On the other hand, there are known catalysts for the oxidation and ammoxidation or ammonoxidation of propylene and other aliphatic olefins and for the ammoxidation or ammonoxidation of aromatic compounds. Such catalysts are for instance disclosed in Richard Krabetz article in Chemie- Ing.- Techn. 46 (1974) 24, pp. 1029–1041.

Ammoxidation or ammonoxidation catalysts are in fact those catalysts which are known to form a nitrile radical when in contact with a molecule having a methyl radical linked to an aromatic ring or to a carbon atom involved in a carbon-carbon double bond, and with oxygen and ammonia.

The ammoxidation or ammonoxidation reaction itself is chemically quite different from the reaction in which nitriles are prepared from amides. Thus, the ammoxidation reaction merely changes a $CH_3$ group into a $C\equiv N$ group, whereas the conversion of an amide into a nitrile involves a transposition of the hydrocarbon chain of the molecule, and generally results in the addition of one carbon atom to said hydrocarbon chain.

SUMMARY OF THE INVENTION

It has now been found surprisingly that the catalysts presently known for the oxidation and ammoxidation or ammonoxidation of propylene and other aliphatic olefins and for the ammoxidation or ammonoxidation of aromatic compounds can be advantageously used for catalysing the formation of nitriles from amides. These oxidation and ammoxidation or ammonoxidation catalysts will be referred to as "ammoxidation-catalysts" in this specification and in the claims.

It has further been found surprisingly that the presence of oxygen plays an important and favourable part in the process of the catalytic conversion of amides into nitriles over such ammoxidation catalysts.

DESCRIPTION OF THE PREFERRED EMBODIMENTS

This invention relates to a new catalytic process for preparing nitriles from amides of the general formula

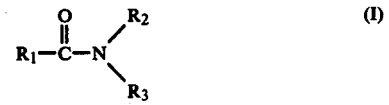

in which $R_1$ represents hydrogen or a lower alkyl radical, $R_2$ represents hydrogen, a lower alkyl radical having a straight or branched chain, an allyl radical, a propargyl radical, an aryl radical selected from the unsaturated mono- and polynuclear aromatic hydrocarbon groups and the mono- and polynuclear aromatic groups comprising one or more heteroatoms, said aryl radical being possibly substituted by one or more substituent groups selected from the lower alkyl radicals, the halogen atoms, the OH and SH groups, the carboxyl group, the trifluoro- or trichloromethyl groups, the cyano group and the $NH_2$ group, or an aralkyl radical in which the alkyl moiety is a lower alkylene group and in which the aryl moiety is selected from the unsaturated mono- and polynuclear aromatic hydrocarbon groups and the mono- and polynuclear aromatic groups comprising one or more heteroatoms, said aryl moiety being possibly substituted by one or more substituent groups selected from the lower alkyl radicals, the halogen atoms, the OH and SH groups, the carboxyl group, the trifluoro- or trichloromethyl groups, the cyano group and the $NH_2$ group, and $R_3$ represents hydrogen, a lower alkyl radical having a straight or branched chain, an allyl radical, a propargyl radical, an aryl radical selected from the unsaturated mono- and polynuclear aromatic hydrocarbon groups and the mono- and polynuclear aromatic groups comprising one or more heteroatoms, said aryl radical being possibly substituted by one or more substituent groups selected from the lower alkyl radicals, the halogen atoms, the OH and SH groups, the carboxyl group, the trifluoro- or trichloromethyl groups, the cyano group and the $NH_2$- group, an aralkyl radical in which the alkyl moiety is a lower alkylene group and in which the aryl moiety is selected from the unsaturated mono- and polynuclear aromatic hydrocarbon groups and the mono- and polynuclear aromatic groups comprising one or more heteroatoms, said aryl moiety being possibly substituted by one or more substituent groups selected from the lower alkyl radicals, the halogen atoms, the OH and SH groups, the carboxy group, the trifluoro- or trichloromethyl groups, the cyano group and the NH₂ group, or a radical of the formula

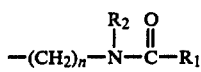

wherein n is equal to 1 to 6, and R₁ and R₂ have the above meanings, with the proviso that at least one of the symbols R₁, R₂ and R₃ is different from hydrogen, said process comprising reacting an amide of formula I in gaseous phase in a reactor on a solid ammoxidation catalyst, at a temperature comprised between 400° and 650° C.

As examples of such ammoxidation catalysts there may be cited:

the following single component catalysts:

bismuth molybdate, such as $BiO_2(MoO_4)_3$, $Bi_2MoO_6$, $Bi_2Mo_2O_9$;

bismuth tungstate, such as $Bi_2W_2O_9$, $Bi_2(WO_4)_3$, $Bi_2WO_6$;

bismuth phosphomolybdate;

manganese molybdate ($MnMoO_4$), cobalt molybdate ($CoMoO_4$), iron (III) molybdate ($Fe_2(MoO_4)_3$), tellurium molybdate ($Te_2MeO_7$), cerium molybdate ($Ce_2(MoO_4)_3$);

vanadium oxide ($V_2O_5$);

tin and antimony salts of molybdic and phosphomolybdic acids;

the multi component catalysts such as:

the multi component molybdates (MCM), which are molybdate catalysts comprising up to nine metallic components in their chemical structure, such as reviewed in particular in the already cited article of Richard Krabetz (Chemie- Ing.- Techn. 46 (1974), 24, p. 1031);

and the multi component uranates and vanadates, which are respectively uranium oxide and vanadium oxide catalysts comprising multiple metallic components in their chemical structure, and the following mixed catalysts:

$Bi_2O_3$—$MoO_3$; $MoO_3$—$Sb_2O_3$; $Sb_2O_3$—$SnO_2$; $CuO$—$Al_2O_3$; $UO_x$—$Sb_2O_3$ ($2<x<3$);

as well as mixtures of any proportions of two or more of these catalysts.

These various ammoxidation catalysts may be used either as pure solids or deposited on a support such as preferably silica.

Among these ammoxidation catalysts the bismuth phosphomolybdates are particularly interesting for the catalytic formation of nitriles from amides.

Among the bismuth phosphomolybdates, suitable catalysts are the stoichiometric bismuth phosphomolybdate in which the ratio Bi/Mo=1/12 and the ratio P/Mo=1/12, but also the bismuth phosphomolybdates in which the ratio Bi/Mo is comprised between 1/50 and 2/1 and the ratio P/Mo is up to ¼.

These ammoxidation catalysts present, with respect to the known catalysts used for preparing nitriles from amides, the unexpected advantage that they have longer active lifes, showing very little catalyst die-off. Their life may still be increased by introducing into the catalytic reactor, during the conversion operation, a stream of oxygen. This introduction of oxygen into the reactor does not in any way interfere with the production of nitriles.

Another surprising advantage of these catalysts is their high activity and selectivity, which can lead to conversion yields of up to 100%.

According to a particular feature of the invention the amides are reacted on the ammoxidation catalyst at a temperature of about 550° to 620° C.

According to another preferred feature of the invention, the amides are reacted on the ammoxidation catalyst at a temperature of about 450° C.

In a preferred embodiment of the invention, nitrogen is added to the gaseous amide reacted on the ammoxidation catalyst, the amount of nitrogen being comprised between 0 and 95% by volume of the gaseous phase, the reagent being supposed in vapour state.

In a still more preferred embodiment of the invention, nitrogen and oxygen are added to the gaseous amide reacted on the ammoxidation catalyst. The amount of oxygen may be up to 50% by volume of the gaseous phase, the reagent being supposed in vapour state.

According to another particular feature of the invention, the used ammoxidation catalyst is bismuth phosphomolybdate, which is preferably in a porous state.

The reaction of conversion of an amide into a nitrile over an ammoxidation catalyst according to the invention may be performed in any heterogeneous catalysis type reactor.

According to the invention the amide is advantageously carried from a saturator to the reactor by means of a vector stream of an inert gas, preferably nitrogen.

According to this invention, the amide may also be injected in liquid phase into a preheating zone of the reactor, which vaporises the reagent before its contact with the catalyst.

According to the invention, there may be injected oxygen into the reactor upstream the catalysis zone or in the catalysis zone itself.

According to another feature of the invention, the space velocity per hour (Spes Harwley velocity), i.e. the weight of reagent (amide) passing through the reactor per weight unit of the catalyst and per hour, is comprised between 0.1 and 100 h⁻¹, depending on the temperature, this velocity being preferably comprised between 2 and 15 in the temperature range of 550°–620° C., and between 1 and 6 at the preferred temperature of about 450° C.

According to the process of the present invention, the amides of the formula I are converted into nitriles in the following ways:

(1) When the R₁ radical represents a hydrogen atom, the corresponding amide, being a formamide of the formula:

in which R₂ has the meanings given above and R₃ has the meanings given for R₂, is converted into a nitrile of the formula

and water or an alcohol of the formula R₃OH, or into a nitrile of the formula

and water or an alcohol of the formula R₂OH, depending on the relative transposabilities of the R₂ and R₃ radicals.

When for instance one of the symbols R₂ and R₃ represents hydrogen, it will be the radical represented by the other symbol which will form the nitrile.

Thus a formamide of the formula

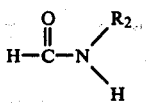 (V)

will be converted to a nitrile of formula III and water and a formamide of formula

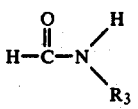 (VI)

will be converted to a nitrile of formula IV and water.

(2) When the R₁ radical represents a hydrogen atom and R₃ represents a radical of the formula

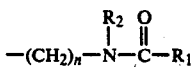

wherein n is equal to 1 to 6, and R₁ and R₂ have the above meanings, the corresponding amide, being an α,ω-diformamide of the formula

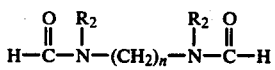 (VII)

in which n and R₂ have the meanings given above, is converted into a dinitrile of the formula

 (VIII)

and water or alcohol of the formula R₂OH.

(3) When R₁ represents an alkyl group, the corresponding amide, being a lower carboxylic acid amide of the formule I, in which
R₁ is alkyl,
R₂ has the meanings given above and
R₃ has the meanings given for R₂,
is converted into a nitrile of the formula

 (IX)

and water or an alcohol.

EXAMPLES

Example 1

Conversion of N-ethylformamide into propionitrile (at 550° C.)

22 g of N-ethylformamide are placed in saturator heated to 120° C. by means of an oil bath. At this temperature the reagent is carried to the reactor by a vector stream of nitrogen. The reactor contains 127.2 mg of stoichiometric bismuth phosphomolybdate and is heated to a temperature of 550° C. The gas mixture reaching the catalyst, comprises N-ethylformamide, nitrogen and oxygen.

The gases leaving the reactor are cooled and condensed. After 4 hours of processing with a small laboratory-type apparatus one obtains 3.2 g of propionitrile, 1 g water and 0.2 g reagent. The N-ethylformamide recovered from the saturator corresponds to the difference between the reagent introduced before the processing and the converted products, namely about 17.6 g. The yield of the reaction is 96% at a space velocity of 6.5 h⁻¹.

Example 2

Conversion of formanilide into benzonitrile 11.6 g of formanilide are placed in a saturator heated at 170° C. Using 184.6 mg stoichiometric bismuth phosphomolybdate catalyst in the reactor heated to 550° C., one proceeds as in example 1. After 2 hours of processing one obtains 884.6 mg of benzonitrile. Yield: 100% at a space velocity of 4 h⁻¹.

After a large number of operations, 10 g of formanilide are totally transformed into benzonitrile.

The catalyst activity has thereby not decreased and the yield is still quantitative.

Example 3

Conversion of N-tert.-butylformamide to α,α-dimethylpropionitrile 30.3 g of N-tert.-butylformamide are placed in a saturator heated to 100° C. Using 131.2 mg of stoichiometric bismuth phosphomolybdate catalyst, one proceeds as in example 1. After 4 hours of processing 4 g of product are recovered. Yield: 45.5%; selectivity: 41.3%; space velocity: 7 h⁻¹.

Example 4

Conversion of N-allylformamide into 3-butenoic acid nitrile 24.35 g of N-allylformamide are placed in a saturator heated to 130° C. Using 38.1 mg of stoichiometric bismuth phosphomolybdate catalyst, and proceeding as in example 1, one recovers after 4 hours 2.6 g of product. Yield: 70%; selectivity: 35%; space velocity: 36 h⁻¹.

EXAMPLE 5

Conversion of benzylformamide into phenyl acetonitrile 17.49 g of benzylformamide are placed in a saturator heated to 175° C. The reactor contains 129.2 mg of stoichiometric bismuth phosphomolybdate catalyst. After 6 hours of processing as in example 1, 5.11 g of product are recovered. Yield: 55%; selectivity: 40%; space velocity: 35 h⁻¹.

Example 6

Conversion of acetamide into acetonitrile 17 g of acetamide are placed in a saturator. The reagent is carried to the reactor containing 97.8 mg of stoichiometric bismuth phosphomolybdate heated to 550° C., by a vector stream of nitrogen. After 4 hours of processing one recovers 0.4645 g of an acetonitrile/water mixture.

Example 7

Conversion of N-methylacetamide into acetonitrile 26.65 g of N-methylacetamide are placed in the saturator. The reactor contains 95.8 mg of stoichiometric bismuth phosphomolybdate catalyst heated to 550° C. After 4 hours, 2.93 g of product are recovered comprising 1.61 g of a mixture of acetonitrile and methanol, the remainder being constituted by the reagent.

Example 8

Conversion of N,N-dimethylacetamide into acetonitrile 25.9 g of N,N-dimethylacetamide are placed in the saturator heated to 130° C. The reactor contains 243.1 mg of stoichiometric bismuth phosphomolybdate catalyst, heated to 550° C. After 4 hours of processing 1 g of a mixture of acetonitrile and methanol and 1.6 g of reagent are recovered.

EXAMPLES 9 to 11

Using the method of example 8, reacting the amides given in column 2 of the following table over the catalyst of Example 8, the recovered product contains a mixture of the nitrile and alcohol or water given in column 3 of the following table I, which also summarizes the data of examples 6, 7 and 8.

TABLE I

| 1 Example | 2 Starting amide | 3 Nitrile-alcohol or nitrile-water mixture contained in the obtained product |
|---|---|---|
| 6 | acetamide $R_1=CH_3; R_2=R_3=H$ | acetonitrile/water |
| 7 | N-methylacetamide $R_1=CH_3; R_2=H; R_3=CH_3$ | acetonitrile/methanol |
| 8 | N,N-dimethyl-acetamide $R_1=CH_3; R_2=R_3=CH_3$ | acetonitrile/methanol |
| 9 | N,N-dimethylpropionamide $R_1=C_2H_5; R_2=R_3=CH_3$ | propionitrile/methanol |
| 10 | N,N-diethylacetamide $R_1=CH_3; R_2=R_3=C_2H_5$ | acetonitrile/ethanol |
| 11 | N-ethylacetamide $R_1=CH_3; R_2=H; R_3=C_2H_5$ | acetonitrile/ethanol |

Example 12

Conversion of N-ethylformamide into propionitrile

N-ethylformamide is placed in a saturator heated to 120° C. At this temperature, the reagent is carried to the reactor by a vector stream of nitrogen, the reactor containing 130 mg of a bismuth phosphomolybdate in which the ratio Bi/Mo=1/8 and the ratio P/Mo=1/12. The reactor is heated to a temperature of 590° C. The gas mixture which contacts the catalyst contains N-ethylformamide, 0.5 liter/hour of nitrogen and 0.5 liter/hour of oxygen. The space velocity is 5.29 $h^{-1}$.

After 5 hours of processing, 5.5 g of reagent have been converted, 3.1 g of propionitrile and 1 g of water are obtained. Yield: 75%.

Example 13

Conversion of N-ethylformamide into propionitrile

N-ethylformamide is placed in a saturator heated to 130° C. At this temperature, said amide is carried to the reactor by a vector stream of nitrogen, the reactor containing 130 mg of $Fe_2(MoO_4)_3$ 2.9 $MoO_3$ (catalyst) heated at 550° C. The gas mixture which contacts the catalyst contains N-ethylformamide, nitrogen and oxygen. After 5 hours of operation, 2.38 g of N-ethylformamide are converted, 1.44 g of propionitrile and 0.86 g of water are obtained. Yield: 80.45%.

Examples 14 to 17

Conversion of N-ethylformamide into propionitrile

Using the same conditions as in example 13, a mixture of propionitrile and water is obtained with the yields indicated in following table II, which also discloses the use ammoxidation catalyst and temperatures.

TABLE II

| Example | Catalyst | Reaching temperature °C. | Yield % |
|---|---|---|---|
| 14 | $SnO_2$—$Sb_2O_3$ | 550 | 40 |
| 15 | $UO_x$—$4Sb_2O_3$ (2<x<3) | 550 | 75 |
| 16 | $CoMoO_4$ | 550 | 20 |
| 17 | $CoMoO_4$ | 570 | 60 |

Example 18

Conversion of N-ethylformamide into propionitrile (at 450° C.).

A gas stream consisting of N-ethylformamide at a space velocity of 3 $h^{-1}$, to which an amount of 0.5 l/h of oxygen is added, is passed over a stoichiometric bismuth phosphomolybdate catalyst (Mo:Bi:P=12:1:1) at a temperature of 450° C.

Under these conditions, the overall yield of propionitrile, being the product of the conversion rate of the N-ethylformamide into the selectivity with respect to the propionitrile formation, amounts to 89.6%.

Example 19

Tests relating to the influence of the temperature on the yield of the conversion of N-ethylformamide into propionitrile The conversion of N-ethylformamide into propionitrile, according to the method of example 18 hereabove, is repeated at various temperatures, whereby the remaining working conditions are kept the same, in order to put in evidence the influence of the temperature on the process according to the invention.

The results of the measurements of the conversion rate of the N-ethylformamide, of the selectivity with respect to propionitrile formation and of the overall yield of propionitrile are given in table III herebelow.

TABLE III

| (Influence of the temperature) (for a catalyst Mo:Bi:P = 12:1:1) | | | |
|---|---|---|---|
| Temperature °C. | Yield % | Selectivity % | Conversion Rate % |
| 400 | 70.87 | 86.11 | 82.30 |
| 425 | 84.81 | 88.12 | 96.23 |
| 450 | 89.59 | 90.57 | 98.92 |
| 475 | 85.60 | 86.64 | 98.80 |
| 525 | 81.62 | 81.62 | 100 |

Example 20

Tests relating to the influence of the catalyst composition on the yield of the conversion of N-ethylformamide into propionitrile.

The conversion of N-ethylformamide into propionitrile is repeated by using the method and working conditions as described in example 18, thereby using however a number of different bismuth phosphomolybdate catalysts, in which the Mo:Bi:P ratio ranges from 16:1:1,33 to 1:1:0,0833 and from 24:2:1 to 3:0,25:1.

The influence of the catalyst composition on the yield, selectivity and conversion rate of the catalytic reaction is given in table IV herebelow.

TABLE IV (influence of the composition)
(for a temperature of 450° C.)

| Composition of the catalyst | | | Yield | Selectivity | Conversion rate |
|---|---|---|---|---|---|
| MO: | Bi: | P | % | % | % |
| 16 | 1 | 1.333 | 88.48 | 100 | 88.48 |
| 12 | 1 | 1 | 89.60 | 90.57 | 98.93 |
| 8 | 1 | 0.666 | 76.64 | 84.90 | 90.27 |
| 2 | 1 | 0.166 | 75.47 | 76.40 | 98.78 |
| 1 | 1 | 0.0833 | 75.26 | 76.48 | 98.15 |
| 24 | 2 | 1 | 89.88 | 90.91 | 98.87 |
| 12 | 1 | 1 | 89.60 | 90.57 | 98.93 |
| 6 | 0.5 | 1 | 74.76 | 77.87 | 96 |
| 4 | 0.333 | 1 | 72.83 | 79.02 | 92.16 |
| 3 | 0.25 | 1 | 57.62 | 81.85 | 70.39 |

Example 21

Tests relating to the influence of the space velocity of the N-ethylformamide on the yield of its conversion into propionitrile The conversion of N-ethylformamide into propionitrile is repeated under the working conditions described in example 18, using the same stoichiometric bismuth phosphomolybdate catalyst, but applying space velocities (Spec Harwley velocities) of the N-ethylformamide passing over the catalyst, which range from 1 h$^{-1}$ to 12 h$^{-1}$. The yield, selectivity and conversion rate data observed under these conditions are given in table V herebelow.

TABLE V (Influence of the space velocity)
(for a catalyst Mo:Bi:P = 12:1:1 and a temperature of 450° C.)

| Space velocity h$^{-1}$ | Yield % | Selectivity % | Conversion rate % |
|---|---|---|---|
| 1 | 85.97 | 87.28 | 98.54 |
| 2 | 84.56 | 85.85 | 98.49 |
| 3 | 89.60 | 90.57 | 98.93 |
| 6 | 79.80 | 84.26 | 94.70 |
| 9 | 73.32 | 75.54 | 97.06 |
| 12 | 71.43 | 72.14 | 99.05 |

Example 22

Tests relating to the influence of the additional oxygen flow rate on the yield of the conversion of N-ethylformamide into propionitrile The conversion of N-ethylformamide into propionitrile is repeated under the same conditions as those described in example 18, using the same stoichiometric bismuth phosphomolybdate catalyst, but applying flow rates of the oxygen added to the reaction gas stream which range from 0 to 1070 ml/h.

The yield, selectivity and conversion rate data observed for each value of the oxygen flow rate are given in table VI herebelow.

TABLE VI (influence of the additional oxygen flow rate)
(for a catalyst Mo:Bi:P = 12:1:1, a temperature of 450° C.
and a space velocity of 3 h$^{31}$)

| Flow rate of O$_2$ ml/h | yield % | Selectivity % | Conversion rate % |
|---|---|---|---|
| 0 | 39.32 | 42.53 | 92.45 |
| 250 | 90.23 | 91.37 | 98.75 |

TABLE VI-continued (influence of the additional oxygen flow rate)
(for a catalyst Mo:Bi:P = 12:1:1, a temperature of 450° C.
and a space velocity of 3 h$^{31}$)

| Flow rate of O$_2$ ml/h | yield % | Selectivity % | Conversion rate % |
|---|---|---|---|
| 500 | 89.60 | 90.57 | 98.93 |
| 750 | 91.12 | 92.53 | 98.47 |
| 1070 | 81.42 | 85.80 | 94.89 |

What is claimed is:

1. A process for preparing nitriles from amides of the general formula

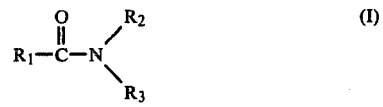

(I)

in which R$_1$ represents hydrogen or a lower alkyl radical, R$_2$ represents hydrogen, a lower alkyl radical having a straight or branched chain, allyl, propargyl, an aryl radical selected from mono- and polynuclear aromatic hydrocarbon groups, wherein said aryl radical can optionally be substituted by one or more substituent groups selected from lower alkyl radicals, halogen atoms, OH and SH groups, a carboxyl group, trifluoro- or trichloromethyl groups, a cyano group and an NH$_2$ group, or an aralkyl radical in which the alkyl moiety is a lower alkylene group and in which the aryl moiety is selected from mono- and polynuclear aromatic hydrocarbon groups, wherein said aryl moiety of said aralkyl radical can be optionally substituted by one or more substituent groups selected from lower alkyl radicals, halogen atoms, OH and SH groups, a carboxyl group, trifluoro- or trichloromethyl groups, a cyano group and a NH$_2$ group, and R$_3$ represents hydrogen, a lower alkyl radical having a straight or branched chain, allyl, propargyl, an aryl radical selected from mono- and polynuclear aromatic hydrocarbon groups, wherein said aryl radical can optionally be substituted by one or more substituent groups selected from lower alkyl radicals, halogen atoms, OH and SH groups, a carboxyl group, trifluoro- or trichloromethyl groups, a cyano group and an NH$_2$ group, an aralkyl radical in which the alkyl moiety is a lower alkylene group and in which the aryl moiety is selected from mono- and polynuclear aromatic hydrocarbon groups, wherein said aryl moiety can optionally be substituted by one or more substituent groups selected from lower alkyl radicals, halogen atoms, OH and SH groups, a carboxy group, trifluoro- or trichloromethyl groups, a cyano group and an NH$_2$ group, or a radical of the formula

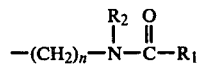

wherein n is equal to 1 to 6, and R$_1$ and R$_2$ have the above meanings, with the proviso that at least one of the symbols R$_1$, R$_2$ and R$_3$ is different from hydrogen, said process comprising reacting an amide of formula I in gaseous phase at a temperature between 400° and 650° C. on a catalyst selected from the group consisting of
(i) bismuth molybdate, bismuth phosphomolybdate, antimony molybdate, bismuth tungstate, (ii) manganese, cobalt, iron (III), tellurium and cerium molybdate.
(iii) $Bi_2O_3$—$MoO_3$; $MoO_3$—$Sb_2O_3$; $Sb_2O_3$—$SnO_2$; $CuO$—$Al_2O_3$; and $UO_x$—$Sb_2O_3$ ($2<x<3$); and
(iv) mixtures of any proportions of two or more of these compounds.

2. A process according to claim 1, in which nitrogen is added to the gaseous amide reacted on the catalyst.

3. A process according to claim 2, in which the amount of added nitrogen is up to 95% by volume of the gaseous phase.

4. A process according to claim 2, in which nitrogen and oxygen are added to the gaseous amide reacted on the catalyst.

5. A process according to claim 4, in which oxygen is injected into the reactor upstream the catalysis zone or in the catalysis zone itself.

6. A process according to claim 3, in which the amount of oxygen is up to 50% by volume of the gaseous phase.

7. A process according to claim 1, in which said amide is selected from the group consisting of N-ethylformamide, formanilide, N-tert-butylformamide, N-allylformamide, benzylformamide, acetamide, N-methylacetamide, N,N-dimethylacetamide, N,N-dimethylpropionamide, N,N-diethylacetamide or N-ethylacetamide, and the corresponding nitrile is, respectively, propionitrile, benzonitrile, α,α-dimethylpropionitrile, 3-butenoic acid nitrile, phenyl acetonitrile, acetonitrile, acetonitrile, propionitrile, acetonitrile or acetonitrile.

8. A process according to claim 1, wherein said catalyst is selected from the group consisting of bismuth molybdate, bismuth tungstate or bismuth phosphomolybdate.

9. A process according to claim 1, wherein said catalyst comprises antimony molybdate.

* * * * *